Feb. 11, 1958  E. M. ROTHERMEL ET AL  2,822,857
METHOD OF MAKING FLEXIBLE CONDUITS
Filed Sept. 20, 1956  3 Sheets-Sheet 1

INVENTOR.
EDWARD M. ROTHERMEL
RUSSELL B. WADDELL JR.
BY
Reuben Wolk
ATTORNEY

Feb. 11, 1958  E. M. ROTHERMEL ET AL  2,822,857
METHOD OF MAKING FLEXIBLE CONDUITS
Filed Sept. 20, 1956  3 Sheets-Sheet 2
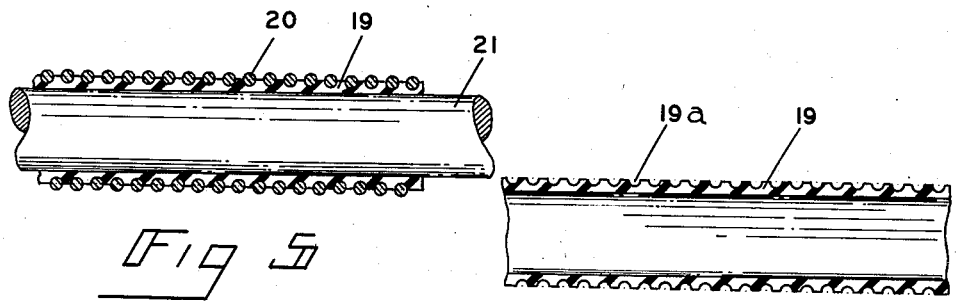
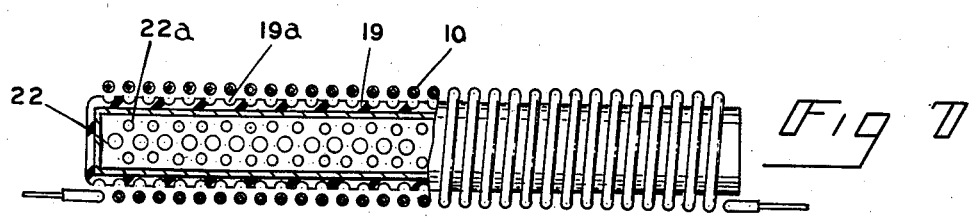
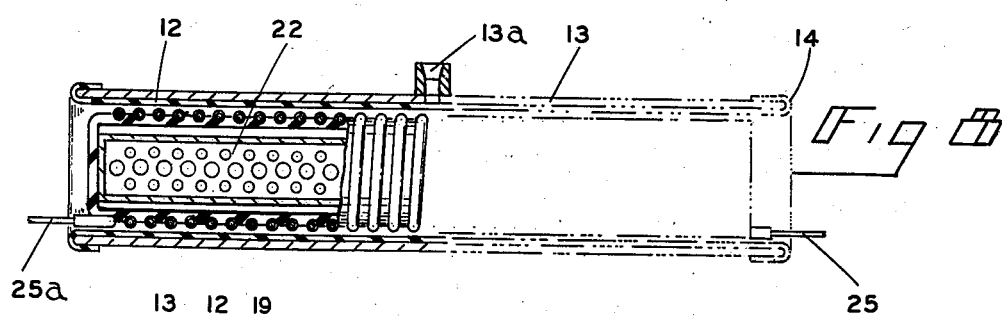
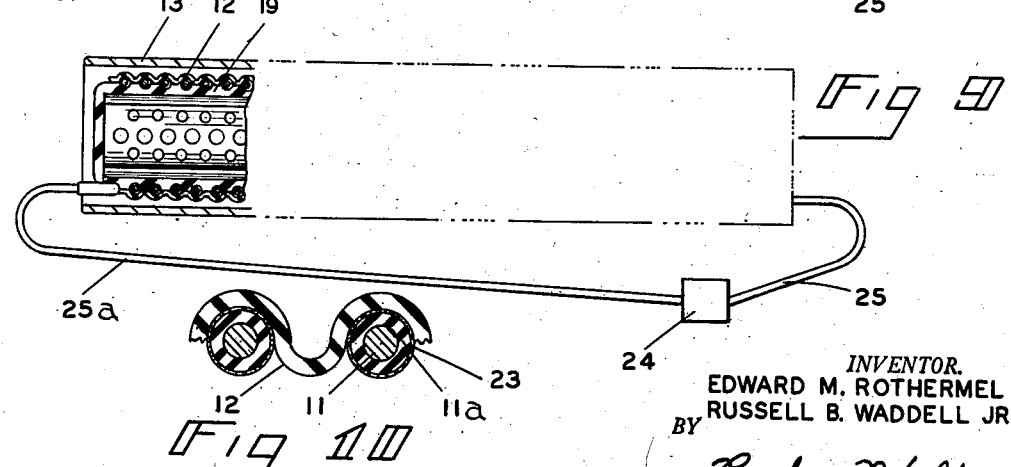
INVENTOR.
EDWARD M. ROTHERMEL
RUSSELL B. WADDELL JR.
BY
Reuben Wolk
ATTORNEY Feb. 11, 1958     E. M. ROTHERMEL ET AL     2,822,857
METHOD OF MAKING FLEXIBLE CONDUITS Filed Sept. 20, 1956     3 Sheets-Sheet 3

*INVENTOR.*
EDWARD M. ROTHERMEL
RUSSELL B. WADDELL JR.
BY

Reuben Wolk
ATTORNEY

United States Patent Office 2,822,857
Patented Feb. 11, 1958

2,822,857
METHOD OF MAKING FLEXIBLE CONDUITS

Edward M. Rothermel and Russell B. Waddell, Jr., Waynesville, N. C., assignors to The Dayton Rubber Company, Dayton, Ohio, a corporation of Ohio Application September 20, 1956, Serial No. 611,007

6 Claims. (Cl. 154—8)

The present invention relates to flexible conduits and particularly to such conduits as are adapted for use in connection with fluid transfer such as in vacuum cleaners, oxygen and respirating devices, cooling systems and the like.

More specifically, the present invention relates to flexible conduits having a corrugated tubular body having a plastic surfaced circumferential reinforcement such as described in copending applications Serial No. 398,126, filed December 14, 1953, now Patent No. 2,782,803; No. 448,722, filed August 9, 1954, now Patent No. 2,766,806; and No. 496,507, filed March 24, 1955, of which the present application is a continuation-in-part. The present invention also relates to an improved method for manufacturing such conduits.

In the art of fluid transfer it is often desirable that a flexible conduit which is impervious to the passage of the fluid being transmitted, light in weight, and pleasing in appearance be employed. The flexibility requirements for this type of hose are often severe and extremely critical and it is not uncommon that the hose will be expected to be sufficiently flexible that it may be bent through an angle of 180 degrees without exerting a substantial counterforce to such bending. Notwithstanding the desire for the lightweight and extreme flexibility, however, it is also a necessary requirement of many hoses within this category that they be reinforced against radial collapse so that when, for example, the hose is bent or flexed through substantially 180 degrees, the inside diameter of the conduit will be maintained and no restriction to the flow of the fluid therewithin will arise. It is also essential that hose of this type be able to withstand many repeated flexings of this nature over a long period of time, for years in fact, without cracking or losing its strength and flexibility.

In order to obtain these desired and necessary features, it has been found that the most practical expedient is to employ a very simple basic conduit construction which consists primarily of a spiral or similar circumferential reinforcing member positioned within an elastomeric tubular body member, the latter being convoluted between the turns of the reinforcing spiral or helix. In order to preserve the relationship between the reinforcing member and the tubular member of the hose according to this basic construction and more specifically to preserve the axial spacing of the individual turns of the reinforcing helix it was previously found desirable to mold or otherwise permanently form the corrugations in the tubular member so that these corrugations surrounded and partially isolated each of the respective turns of the reinforcing member. The individual turns were thus held apart by a distance at least equal to twice the thickness of the tube whenever a force was exerted against these turns which tended to cause them to collapse upon each other and to constrict the flow of the fluid in the hose. Thus, the recent developments in the art of flexible conduits have made available the theoretically desirable simple hose construction involving only an outer tubular body member and an inner reinforcing member.

Such construction involves its own problems however in that the irregular inner conduit surface results in loss of fluid transmission efficiency and the reinforcing member is exposed to the deteriorating effects of any fluid passing through the conduit. In the development of this basic construction involving the tubular member surrounding a helical reinforcement, it was first found that the undesirable corroding and wearing effects upon the reinforcing member of the fluid passing within the conduit could be circumvented by forming the reinforcing coil of a material which was resistant to such influences. Consequently, a helix of a material presenting a plastic surface such as a plastic coated wire was found to be desirable. It was later discovered that by proper coordination of manufacturing procedures and apparatuses, the corrugations of the tubular member exposed to the inner conduit surface as well as those portions of the reinforcing member so exposed could be aligned so that a substantially smooth surface would be provided, thereby eliminating the previously encountered loss of efficiency in the fluid transmission capabilities of the conduit. While these relatively recent developments have eliminated a large majority of the objections to the otherwise desirable basic construction involving tube and reinforcing wire; and while the use of this basic construction did result in improved flexibility and lightweight, it has been recognized that still greater flexibility and durability are desirable.

It is accordingly an object of the present invention to provide a flexible conduit which is light in weight, of pleasing appearance, extremely flexible and yet suitably reinforced against radial collapse.

It is a further object of the present invention to provide such a conduit incorporating the basic construction of an outer elastic tubular member surrounding an inner circumferential reinforcing member.

It is still another object of the present invention to provide such a conduit incorporating a plastic coated wire reinforcing member.

It is still a further object of the present invention to provide an improved and considerably less expensive and less time-consuming method for the manufacture of such flexible conduits.

In order to achieve the above and other objects and advantages of the present invention which will be apparent from a reading of the following disclosure, it is proposed to dispense with the previously practiced molding of the tubular hose body around the individual turns of the reinforcing member. It has been discovered that this elimination of the molding or other permanent establishment of the corrugated cross section of the tube eliminates obstacles against the free and unopposed flexing of the conduit which were present in the prior art constructions involving such permanently fixed corrugations. This elimination of the molded corrugation of the tube of course also eliminates the means previously relied upon for preserving the individual turns of the reinforcing member in the desired axially spaced position. The present invention which thus allows for the elimination of this previously considered necessary expedient provides a hose of greatly improved flexibility. At the same time, it further provides for satisfactory spacing of the individual reinforcing turns with the unobvious attendant result of a satisfactory means for holding the individual wire turns in their proper place.

To accomplish the purposes above set forth, the present invention provides an elastic tubular hose body which deviates solely by its inherent elasticity from its normally cylindrical configuration so that the corrugations resulting when such tubular body is positioned around a circumferential reinforcement are not molded or otherwise permanently fixed therein. In order to achieve the desired corrugation, the elastic tubular member is made to have an inside diameter slightly smaller than the outside diameter of the circumferential reinforcement about which it is to be positioned. The smaller tube is then expanded within its elastic limit to allow for the insertion of the circumferential reinforcement whereupon the tube is released and allowed to elastically embrace the reinforcement.

It has been found further that this elastic grasp of the tube upon the individual circumferential reinforcing turns will in fact provide a satisfactory means for holding these turns in their desired uniformly spaced relationship axially of the conduit if the modulus of elasticity of the tube and its original or "at-rest" dimensions are properly related to the dimensions of the reinforcing turns. While the interrelated variables of the elasticity of the tube and the dimensions thereof may be changed within a rather wide range, it has been found that satisfactory positioning of the wire turns may be insured if the tube and circumferential reinforcement are so correlated that the elastic corrugation of the tube as it is released upon the reinforcement will result in a corrugation. As a result, the innermost surface of the inwardly corrugated depressions will lie in substantially the same cylindrical plane as the innermost surfaces of the circumferential reinforcing turns. To assist the elasitcally corrugated tube in preserving the relative position of the individual turns of the circumferential reinforcement, a suitable adhesive or bonding agent may be applied to either or both contacting surfaces of the tube or the reinforcement.

The adhesive or bonding agent employed for this purpose is preferably of the variety capable of setting or curing at temperatures on the order of room temperature. This is particularly desirable in the case of conduits employing a tubular member of elastic, thermoplastic material since any application of heat to the conduit would result in the plastic flow of the tubular member thereby detracting from its desired elastic engagement with the circumferential reinforcement. A refinement and modification of the present invention however does contemplate the use of a heat responsive adhesive capable of being cured at higher temperatures in that, where the circumferential reinforcement is made to consist of a continuous metallic or other conductive wire surrounded by a plastic coating, an electric current may be passed through the conductive wire thereby to provide localized heating in the immediate area of the wire which is of course the area which is desired to be bonded to the tubular hose body.

Of equal importance are the contributions of the present invention to improvements in the method of manufacture of flexible conduits. The conduit according to the present invention may be manufactured with a minimum of time and only the most elementary equipment. In view of the basic construction involving a tubular sheath and a circumferential reinforcement therewithin and the fact that an elastic relationship between tube and reinforcement is desired, it is necessary only that the tube be expanded so as to allow for the insertion therein of the reinforcing member whereupon the tube may be released to elastically engage the reinforcement. Where the application of an adhesive or bonding agent is contemplated, the same may be readily applied to the inner surface of the tube and/or the outer surface of the reinforcement prior to the release of the former upon the latter and preferably at the time the reinforcing member is being moved into the tube. Where localized heating is desired to vulcanize or cure the adhesive used to permanently affix the tube to the wire turns at the area of their mutual contact, such may be conveniently provided by merely subjecting the extremities of the wire reinforcement to a source of electric current.

While the uniform resilience of the circumferential reinforcing member and the uniform elasticity of the surrounding tubular hose body may be relied upon to provide a uniform axial spacing of the individual turns of the reinforcing member in the finished product, it is often desirable that the individual turns of the circumferential reinforcing member be fixed in their desired axially spaced relationship before they are subjected to the elastically embracing influence of the surrounding tubular body. While a satisfactory hose may be constructed by merely stretching a helical reinforcing member to the desired length before releasing the elastic tube to surround the same, or by spacing the individual turns of the reinforcing member upon a mandrel or the like previous to releasing the tube, it has been found that the elastic collapse of the tube upon such spaced turns may cause them to move from their desired spacing as a result of the high coefficient of friction of the surfaces of the tube and the reinforcing member coming in contact while the former is moving around the latter to elastically embrace and at least partially surround each of the individual turns thereof. The present invention accordingly provides novel means for holding the helical reinforcement prior to and through the initial stages of its being contacted by the tubular component. Such means may involve an exteriorly grooved cylindrical mandrel wherein the grooves thereon extend spirally thereof according to the desired final position of the reinforcing member and are of a dimension and curvature to firmly receive the reinforcing member and partially surround each of the turns thereof whereby they will be held against slipping or being moved from their spaced position. To facilitate the overall manufacturing operation, this wire positioning mandrel is preferably made expansible so that it may be enlarged at the time the individual wire turns are positioned thereon and then collapsed after the tube has been applied to the wire and has exerted its influence upon the relative axial spacing of the individual turns thereof. One form of such wire spacing mandrel is an inflatable air bag having spiral or circumferential grooves about its exterior surface to receive and hold the individual turns of the circumferential reinforcement ultimately to be employed in the hose. The circumferential reinforcement is placed about the wire holding device whereupon the air bag is inflated to exert a radially outward force upon the surrounding reinforcement, thereby to hold the same until the final assembly whereupon the inflation is released and the air bag conveniently withdrawn from the interior of the finished hose. In lieu of an air bag such as would be capable of withstanding the forces to which it would be subjected, a simple elastomeric boot or sleeve may be employed about a hollow perforated mandrel, the ends of which may be hermetically sealed except for an opening to control the amount of air within the mandrel and thereby to control the inflation of the expansible sleeve. The perforated mandrel will give a certain amount of stability to the elastic sleeve and still allow the inflation thereof to expand the same and to force the circumferential reinforcement held thereon into a fixed position preparatory to receiving the outer tube of the finished hose.

It has been found that varying flexing characteristics may be imparted to the finished hose if the spacing of the individual wire turns of the circumferential reinforcement is varied, the turns being more closely spaced where greater rigidity is desired and vice versa. For example, in order to prevent wearing of the hose near its ends where it is usually associated with a rigid fitting and is subjected therefore to a concentration of flexing, the individual turns of the circumferential reinforcement may be more closely spaced whereby the hose will offer more resistance to such concentrated flexing thereby to prolong the operational life of the overall conduit. Where an expansible mandrel or an air bag of the type discussed above is employed, it is possible, in accordance with the teachings of this invention, to initially form the grooves or other wire receiving devices in the expansible mandrel or air bag so that the grooves and the reinforcing turns ultimately to be placed therein will be more closely spaced at certain points throughout the length of the hose body, for example at or near the ends thereof wherein concentrated flexing is anticipated.

Further in keeping with the teachings of the present invention and still further utilizing the simplicity of the hose construction described herein, it has been found that a hose according to the present invention may be satisfactorily constructed without the use of any mandrel or other holding device for the circumferential reinforcement or the tubular body portion to be associated therewith. This is particularly true in the case of hose which will have an inside diameter of less than one inch; and it has been found that a satisfactory hose may be made by merely sliding a reinforcing coil into the tubular body member either while the tubular member is expanded or the coil is diametrically contracted. Once the coil is positioned within the tubular member, the component or components which have been temporarily deformed to allow for convenient insertion of the coil into the tube may be released to return to their normal position as it existed before such deformation, whereupon the tube will elastically embrace the coil in the manner of the present invention. In order that the individual turns of the circumferential reinforcement will be uniformly spaced as required by the present invention, a variety of holding and positioning expedients may be used in lieu of the supporting mandrel. For example, the helical reinforcing coil may merely be expanded and held at its ends either by mechanical or manual expedients prior to the association therewith of the surrounding and embracing tubular member. It has been found further that the helical reinforcing coil may be formed in the first instance with its circumferential turns spaced in the ultimately desired arrangement. In such cases, the circumferential reinforcement need not be held at all prior to the release thereupon of the tubular member since the formation of the coil itself will provide the desired spacing. It will be understood, of course, that where variations in this spacing of the individual turns throughout the length of the hose are desired, the variations may be provided at the outset while the coil is being initially formed by merely varying the lead or pitch of the spring forming machine.

The invention thus generally described may be more clearly understood by reference to the following detailed description of certain preferred embodiments thereof in connection with which reference may be had to the appended drawings.

In the drawings:

Figure 5 is an elevational view in partial cross section of an inflatable wire holding device for use in connection with the present invention at an intermediate stage of its manufacture.

Figure 6 is a cross section of the wire holding tube formed according to the illustration in Figure 5.

Figure 7 is an elevational view in partial cross section of the wire holding tube shown in Figures 5 and 6 showing the wire as it is about to be positioned thereupon.

Figure 8 is an elevational view in partial cross section showing the wire positioned upon the wire holding device of Figure 7 within the tubular hose body.

Figure 9 is an elevational view in partial cross section showing the final position of the components illustrated in Figures 6, 7 and 8 and one method for properly integrating the hose components.

Figure 10 is an enlarged cross section through a portion of the body of a conduit according to the present invention showing the manner of association of the tubular body portion thereof with the circumferential reinforcement.

Figure 1:
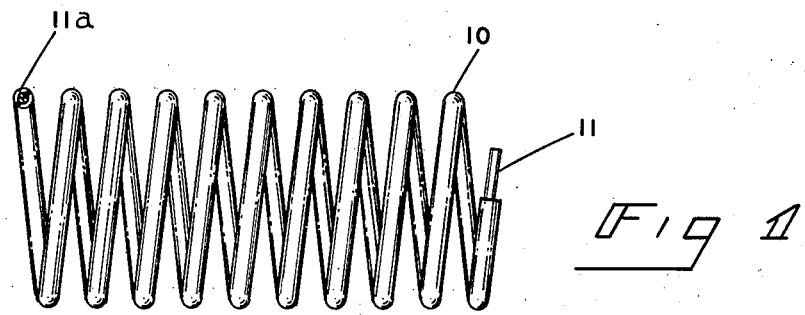
Figure 1 is a perspective view in partial cross section of a suitable circumferential reinforcement to be employed in hoses according to the present invention.

Referring now to Figure 1, the numeral 10 designates generally one form of circumferential reinforcement suitable for incorporation in hose according to the present invention, this form being a wire or resilient strand or cable 11 having a plastic coating 11a thereon. The core or strand 11 either before or after the application of the coating thereto is subjected to a spring winding operation whereby the reinforcing helix of the continuous spiral configuration is obtained. In the spinning operation by which the helical reinforcement is made, the spacing between the individual turns of the helix should be made to conform substantially to the individual spacing which will be desired in the finished hose. In the case of one form of flexible conduits suitable for use in connection with domestic vacuum cleaners, this spacing between the individual turns of the wire may be approximately ¼ inch. In the case of vacuum cleaner hose having a reinforcement, the individual turns of which are spaced approximately ¼ inch, a desirable wire diameter is from 0.045 inch to 0.051 inch and the plastic coating thereon has a thickness of approximately 0.014 inch. In the case of vacuum cleaner hose this plastic coated wire may be spun or otherwise formed into a helix such as shown in Figure 1 having an inside diameter of 1%₂ inches.

Where the reinforcing helix is initially formed so that the individual convolutions thereof will be axially spaced by one-fourth of an inch, it will be understood that the coil when it is in its relaxed and normal position without any extraneous influences, will have the one-fourth inch spacing which will provide 48 convolutions per axial foot of the helix. During the positioning of this helix within the tubular body member or during other handling of the helix to be hereinafter described, the same may be stretched slightly in an axial direction so as to provide a uniform spacing of the turns and to hold the helix in a substantially straight position while it is being inserted in the tube. Such stretching may result in slightly increasing the spacing between the individual turns thereof which in turn will result in a decrease in the number of convolutions per axial foot. The amount of stretching necessary or required and the influence thereof upon the spacing of the individual turns may, of course, be controlled depending upon the ultimately desired number of reinforcing turns in the finished conduit. It has been found that if the preformed helix is not subjected to any substantial stretching in the manufacturing process, the number of turns therein may be maintained at substantially 48 turns per axial foot up until the coil is surrounded by the elastic tubular member. Once the tubular member is released upon the helix however and is allowed to elastically embrace the individual turns thereof, the elasticity of the tubular member will result in a shortening of the overall length of the helix and a pulling of the individual turns thereof into more closely spaced relationship. For example, the helix may have 48 turns per axial foot prior to the release of the outer tubular member. After this release, the tubular member will have sufficient elasticity to depress portions thereof between the individual turns, sufficiently to cause these portions to lie in the plane of the inner periphery of the helix. The tendency of these portions to cause axial movement of the helix will cause the helix to assum a reduced spacing of from 50 to 54 turns per axial foot.

As stated above, there may be instances where improved flexibility at certain points throughout the length of the hose body and particularly at the ends thereof may be desired and this may be obtained by reducing the spacing between the individual turns or, stated otherwise, by increasing the number of turns per axial foot of the helix. It has been found for example that a noticeable effect upon the flexibility of the hose may be achieved by providing for 44 turns per axial foot at these points where greater flexibility is desired; in contrast to 48 turns per axial foot throughout the remainder of the hose body.

About the helix thus formed with the individual helices thereof spaced in their desired position is placed an elastomeric tube 12 which, in the case of a vacuum cleaner hose employing the above-described helix, may be formed to have a one inch inside diameter and to be approximately 0.028 inch in wall thickness. The diameter and wall thickness of the tube 12 are substantially uniform throughout its length.

While this tube 12 may be formed of any elastomeric material, it has been found preferable that a plastic elastomeric material be employed and particularly such thermoplastics as polyvinyl chloride and similar vinyl resins having a good elastic memory. Vulcanized rubber may also be used. The term "plastic" as here employed is meant to include a material that contains as an essential ingredient an organic substance of large molecular weight, is solid in its finished state, and, at some stage of its manufacture or in its processing into finished articles, can be shaped to flow. Such materials are said to have "good elastic memory" when they are capable of retaining for long periods of time, in the case of hoses of this invention, for periods equal to the expected life of the hose, the elastic quality of endeavoring to return to whatever shape and dimensions in which they were originally formed, within the elastic limits of the material.

Such a tube as well as the coating to be applied to the wire may be composed of the following:

| | Parts by weight |
|---|---|
| Polyvinyl chloride resin | 100 |
| Dioctyl phthalate | 70 |
| Lead stabilizer | 3 |
| Filler (e. g. hydrated silicon dioxide) | 10 |

Figure 2:
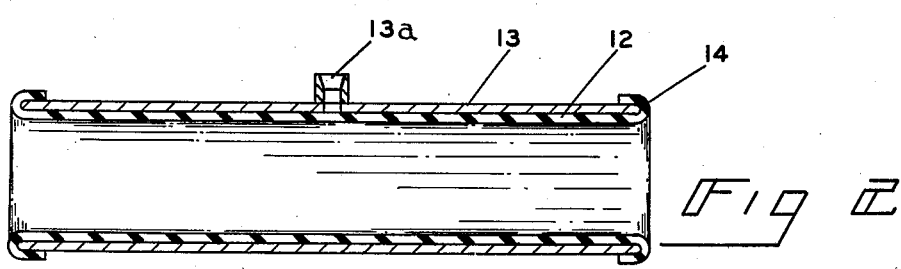
Figure 2 is a cross-sectioned elevational view of a forming device with the tube ultimately to form the hose body positioned therein.
Figure 11:
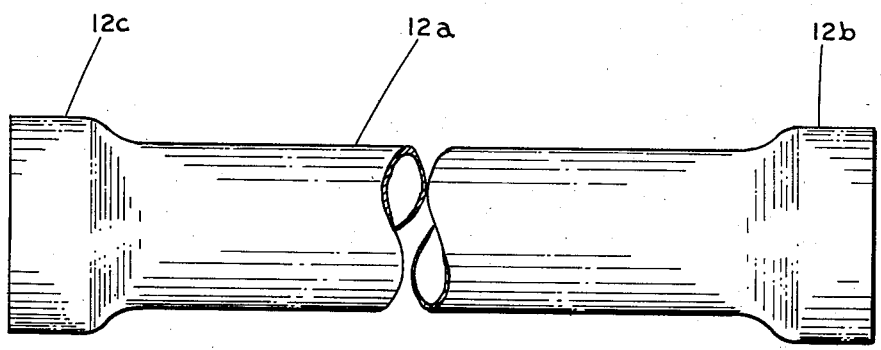
Figure 11 is an elevational view of a tubular hose body member which is modified at its end portions for special adaptability in the method of the present invention.

As shown in Figure 2, the elastomeric tube formed as described above is placed within the forming cylinder or expander 13 and the ends of the tube 12 are folded over the ends of the expander 13 as shown at 14 thereby to form a seal between the inner surface of the expander 13 and the outer surface of the tube 12. The expander cylinder 13 is of a larger diameter than the relaxed normal diameter of the tube 12 and is of a greater diameter in fact than the outside diameter of the helix of plastic coated wire such as shown in Figure 1. Once the tube 12 is positioned within the expander and the ends of the tube are "cuffed" over the ends of the expander as shown at 14, the air is at least partially removed by means of a vacuum pump or the like via the opening 13a from the space between the smaller diameter tube 12 and the larger expander 13 so that the atmospheric pressure within the tube will cause it to expand against the inner cylindrical surface of the expander 13. Where the elasticity of the tubular member is such that considerable force will be required to expand it radially, or where strong vacuum forming means are not available, it may be desirable to assist the expansion of the tube by subjecting the interior thereof to pressurized air or like fluid along with the application of a vacuum to the exterior thereof as in the case of the expander tube 13. In most cases, the application of the compressed air need only be temporary and at the beginning of the expanding operation since a smaller vacuum may be relied upon to hold the tube in its expanded position once it has reached such position. The temporary application of pressurized fluid to the interior of the tubular member therefore may be accomplished simply by inserting a temporary plug in one or both ends of the tubular member such as 12 while it is in the expander tube 13 and introducing compressed air through the open end of the tube or through an opening in one of the plugs at one of the ends of the tube. Once the pressurized fluid has served its purpose in expanding the tube, the end plugs may be removed to allow the insertion of the helical reinforcement as described below. Where the material forming the tube 12 has a high modulus of elasticity or where it is to be radially expanded to a considerable distance in excess of its normal diameter, it has been found that the "cuffing" of the end of the tube over the ends of the expander tube 13 may be facilitated if the end portions of the tube are enlarged during the initial stages of its manufacture. A tubular hose body member with its end portions radially expanded or enlarged according to one modification of the present invention is illustrated in Figure 11 wherein the intermediate body portion 12a is of cylindrical configuration and has a diameter determined by the diameter of the reinforcement about which it is to be positioned and the ultimately desired hose diameter and relationship between the tube and the reinforcement as to the depth of the configurations of the former between the turns of the latter. The end portions 12b and 12c however are of a greater diameter which correspond to and are preferably greater than the diameter of the expander tube such as 13 in Figure 2. As a result of this enlarged diameter of the end portions of the tubular hose body member, such portions may be easily formed over the ends of the expander to effect the necessary air seal between the expander tube 13 and the tube 12 to allow for the creation of a vacuum about the tube 12. A tube such as that illustrated in Figure 11 may be formed in the first instance by the well-known process of extrusion which will result in an overall cylindrical configuration. Once the tube is cut to its desired length, the end portions may be subjected to conditions which will render them capable of plastic flow and then expanded by suitable mechanical means. In the case of a tube of thermoplastic material, the end portions thereof may be heated for example by insertion in hot water. The mechanical expansion means may comprise merely a conical shaping plug which may be forced into the end of the tube to expand the same. Suitably controlled compressed air or air streams may be employed for this expansion while the material is in its state of plastic flow.

Figure 3:
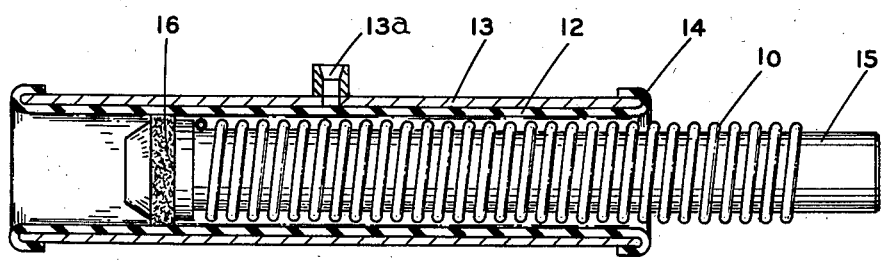
Figure 3 is an elevational view in partial cross section of the hose and tube of Figure 2 illustrating the insertion of the circumferential reinforcement within the tube.

As shown in Figure 3, the wire helix 10 which may be positioned upon a supporting mandrel 15 may then be freely inserted in the elastomeric tube 12 while this latter is held in its expanded position. As further shown in Figure 3, the introduction of the helix 10 into the tube 12 may be preceded by the passing through the tube of a sponge or similar plunger 16 saturated with a suitable adhesive or bonding material so as to coat the entire inner surface of the tube 12 with such agent. Once the wire is positioned within the tube and the individual turns thereof are properly spaced, the partial vacuum drawn through the orifice 13a may then be released and the ends or cuffed edges 14 of the tube 12 may be removed from the expander tube 13 whereupon the expanding force will be released and the elastomeric tube 12 will snap back in an effort to assume its previously established normal diameter whereupon it will elastically embrace the helix 10. Where certain solvents or solvent-released adhesives are used and the tube 12 is released before the adhesive dries, the adhesive will act as a lubricant and allow the tube to slide around the reinforcement without disturbing its desired position.

Figure 12:
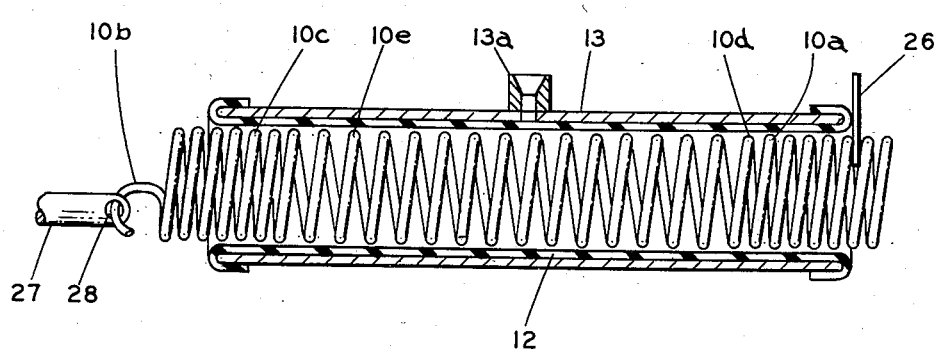
Figure 12 is an elevational view in partial cross section illustrating the manner in which the circumferential reinforcement may be held within the expanded tubular body member prior to the release of the latter upon the former.

Instead of placing the member 10 upon a mandrel prior to its insertion in the expanded tube 12, this supporting coil may be pulled through the tube without using a mandrel. This modification is illustrated in Figure 12, and as is best shown there, the helix is pulled through by means of the rod 27. In order to perform its operation, the rod 27 is passed through the inside of the tube from left to right and the end 10b is passed through the opening 28 in the rod. The rod is then pulled back from right to left and a piece of metal 26 is inserted between the last two turns of the helix in order to cause it to become wedged against the right-hand end of the tube 13. This will hold the right-hand end of the coil in its required position while the motion of the rod to the left is continued until the left-hand end of the coil is protruding by one or two turns. Where the helix 10 is preformed so that the individual turns are axially spaced in the desired finished position, the rod merely serves to supply sufficient tension to hold the helix in a substantially cylindrical configuration prior to the release of the tube 12 thereon. This procedure, however, may have an additional function in controlling the helix 10 in order to apply any desired axial tension and spacing of the turns. In some instances the spacing between turns may be equal. On the other hand, the spacing of the turns at the ends may be greater than in the center, in order to provide increased flexibility at the ends. Still another variation may exist as shown in Figure 12, where the turns 10c and 10d at the ends are more closely spaced than the turns 10e in the remainder of the body. This spacing may be provided during the formation of the helix as described above in order to provide for increased stiffness in the vicinity of the ends. In this case sufficient tension is placed upon the helix to maintain this variation in spacing and the helix is held in this position until the vacuum holding the tube 12 in its expanded condition is released, thereby allowing this tube to snap back and engage the helix 10. This act of contraction will cause the tube to become corrugated when encircling the helix. As a result of this step the influence and action of the spring and the tube upon each other will permit the required elasticity and rigidity in the finished product.

Figure 4:
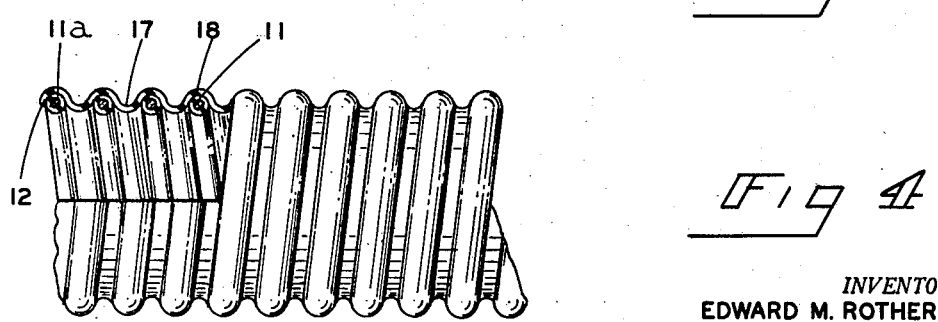
Figure 4 is an elevational view in partial cross section of a flexible conduit constructed according to the present invention.

The nature of this elastic engagement of the elastomeric tube 12 with the helical reinforcement which itself has a certain elasticity and resilience is such that the tube 12 will be depressed between the individual turns of the wire helix to provide the corrugated or convoluted configuration shown in Figure 4. By carefully controlling the elasticity of the tube and its diameter relative to the diameter of the helix and the cross-sectional diameter of the plastic coated wire forming the same, the inward corrugations 17 may be made to extend substantially to the cylindrical plane defined by the innermost portion of the helix 10. At the same time, of course, the tube will pass over the individual wire turns to form the crests or raised ribs 18 which will pass circumferentially of the tube in conformance with the alignment or positioning of the reinforcing helix therewithin.

Referring now to Figures 5 through 10 wherein a modified hose according to the present invention and a modification of the method for manufacturing the same is shown, it will be seen that instead of using the rigid, smooth-surfaced cylindrical mandrel such as 15 in Figure 3 for holding and positioning the individual turns of the circumferential reinforcement 10, an expansible or elastomeric supporting or wire-holding cylinder or mandrel 19 may be employed. This mandrel is formed with external grooves or depressions 19a conforming to the pattern of the circumferential reinforcement to be held thereby. The function of these grooves is to securely hold the individual turns of the circumferential reinforcement in their desired position while the same is being positioned within and/or engaged by the tube 12. As shown in Figure 5 the groove 19a may be conveniently provided in a plastic material and particularly in a vulcanizable material such as rubber, by merely winding therearound a wire 20 or similar facsimile of the reinforcement utlimately to be held by the supporting mandrel 19. The wire 20 should be such that it will impress a groove of such cross-sectional size and configuration that the turns of the reinforcement may be nested therein. During the winding of the wire 20 about the tubular expansible mandrel 19, the latter may be supported by a second mandrel 21 of rigid material so that the winding of the wire or similar facsimile of the ultimately to be employed hose reinforcement will be impressed into the exterior of the expansible mandrel 19. These impressions may be permanently fixed within the mandrel 19 by subjecting the latter to the conditions at which it will be susceptible to plastic flow and thereafter allowing it to set. Where a thermosetting plastic material or a vulcanizable composition is employed for the supporting mandrel 19, the wire 20 may be held tightly around the expansible mandrel 19 supported by the rigid mandrel 21 until such time as the vulcanization has been completed and the grooves will be permanently fixed in the exterior of the mandrel 19 by heat or vulcanization.

While one preferred method for preforming the nesting groove 19a in the expansible mandrel has been above described, it is to be understood that other means for so forming the groove may be employed such as spiral or circumferential cutting of a cylindrical sleeve or by molding the grooves during the initial formation of the tubular member. It will be further understood that the spacing of this preformed groove 19a may be made to correspond to the ultimately desired spacing of the circumferential reinforcing turns in the finished hose. Where for example, as explained above, it may be desirable to increase the flexibility of the hose at certain points throughout its length, this may be effected by increasing the number of turns per axial foot of the reinforcing helix. The expansible helix or circumferential reinforcement supporting mandrel may be modified so that the nesting grooves such as 19a thereof will vary in their spacing according to the pattern ultimately desired in the finished product.

As shown in Figures 7 and 8, the expansible mandrel or supporting cylinder 19 which may be in the form of a tube with a closed end is positioned upon the perforated hollow mandrel 22 having openings 22a through the wall thereof so that the former covers and effects an air seal over all the perforations of the latter. Upon the introduction of air into the hollow interior of the mandrel by suitable valve means (not shown), the air will tend to expand the wire supporting mandrel 19. It is of course to be understood that other means which may or may not involve inflation may be employed for expanding the wire supporting mandrel 19. For example, the expansible unit may comprise nothing more than an elastic cylinder which is closed except for suitable valve means to control the introduction and retention of air therewithin; and such unit may then be inflated directly through the valve means in the manner of a balloon or an inner tube for a tire.

Where grooves such as 19a are formed on the supporting mandrel 19, this supporting device is positioned within the hose reinforcement such as the helix 10 and the individual turns of the latter are positioned to register with such grooves 19a as shown in Figure 7. Once the coil or helix is so positioned, the supporting cylinder or mandrel may then be expanded as by the above described inflation with or without the use of a perforated mandrel, so that the supporting mandrel 19 will be forced against the interior of the helix as shown in Figure 8. It can be appreciated that such force will act to hold the helix and the individual turns thereof in their desired position especially where the grooves 19a are utilized.

While the mandrel 19 is inflated to hold the helix 10 securely thereon, the mandrel and helix are axially inserted into the plastic tube 12 while it is expanded in the expander cylinder 13. The ends 14 of the tube 12 are then unfolded from over the ends of the expander cylinder whereupon the tube will seek to return to its normal position; i. e., to that size and diameter which it had prior to being expanded, and will firmly and elastically embrace the helix 10 and the mandrel 19 supporting the same. By this time, all of the forces which might act to displace the helix or the individual turns thereof from their desired axially spaced relationship have been spent, and the encircling tube 12 will act to preserve the established spacing of the individual turns of the reinforcing helix. The supporting mandrel 19 is therefore no longer necessary and the same may be removed from within the hose body by releasing the air from the interior thereof whereupon the mandel 19 will collapse to the dimensions prior to its having been inflated and may be conveniently withdrawn.

As in the case of the method illustrated in Figures 1 through 4, it may be desirable to insure further integration and permanency of association of the components in the finished hose by employing an adhesive between the surfaces of the helix 10 and tube 12 to be in contact in the finished product. In such cases it is usually desirable to preserve the expansible mandrel in its supporting relation to the helix until the adhesive has become permanently set.

Where flexible conduits according to the present invention are formed from a tube of thermoplastic material such that the subjection thereof to elevated temperatures would result in a plastic flow of such material and an attendant loss of the ability of the tube to elastically embrace the reinforcing helix in the manner taught by the present invention, it may still be desirable to employ a heat responsive adhesive such as a thermosetting resin which will require temperatures above the softening or "flow temperature" of the plastic material of the tube. Such adhesives may be employed without detriment to the elasticity of the tube in keeping with the present invention where localized heating only in the area of the contact between the tube 12 and the helix 10 is applied. Where, as in the illustration of Figure 1, the helix is composed of a wire or other conductive cable as a core, an electric current may be passed through such conductor to cause sufficient localized heating to cure the adhesive.

Still greater convenience may be imparted where an adhesive according to the following composition is applied to the helix as a coating thereover even before the helix is positioned within the tube 12 or associated or in contact therewith. Such an adhesive is composed of the following ingredients in the weight proportions specified:

| | Parts by weight |
|---|---|
| Polyvinyl chloride resin | 70 |
| Condensed ketone thermoplastic | 30 |
| Tetrahydrofuran | 450 |
| Methyl ethyl ketone | 450 |

This adhesive is in the form of a solution or suspension which may be applied to the helix and will then dry or harden forming a film 23 thereon subject to being activated when, after the helix is in contact with the tube, heat is applied. This film 23 and its relationship to the tube 12 and the helix 10 of a metallic cable 11 coated with a plastic material 11a is shown in Figure 10. Once the tube 12 has been released from the expader cylinder 13 and has elastically embraced the helix 10, the localized heating may be established to cure or to set the adhesive film 23. Where the core 11 is of a conductive material, the plastic coating 11a may be removed from each of the ends thereof and the ends then connected to a source of electrical energy such as the schematically shown battery or generator 24 by the conductive leads 25 and 25a. This electrical current will be allowed to pass through the wire or similar core 11 until the same becomes sufficiently heated to cause the adhesive film 23 to become set while at the same time becoming integrated with the tube 12 and the helix 10 and thereby permanently joining such tube and helix. As stated above, where the inflatable or expansible mandrel is employed for supporting the helix prior to its final contact with the tube 12, it may be desired to preserve the supporting relationship between supporting cylinder or mandrel 19 and the helix 10 until after the final application of the localized heating through the core 11.

In lieu of the localized heating in combination with the above-described adhesive, it has been found that satisfactory adhesion between the tube and the surface of the reinforcing member may be achieved by the simple expedient of heating without any adhesive. This heating may be localized as described above or provided by any of the conventional and well-known heating expedients such as hot air ovens, induction heating and the like. It will of course be understood that the elasticity of the tubular member must be maintained throughout such heating so that the temperatures required for bonding the tube to the reinforcement should not be such as to cause any plastic flow in the tubular member which would tend to normalize the elastic deformation thereof or to inhibit the elastic memory which is relied upon for the unique engagement of the tubular member about the helical reinforcing member according to the present invention.

It will be understood that the size and elasticity of the tube relative to the size and resilience of the reinforcement may be so controlled that upon the release of these respective components and the free reaction to the influence of each to the other, the innermost portions of the convolutions of the tube may be made to lie in the cylindrical plane of the innermost portions of the reinforcement so that a substantially cylindrical inner hose surface will result. In other instances, however, it may be desired to provide a hose which may be axially stretched or elongated; and, in such case, the relative size and elasticity of the respective components may be so controlled that when the tube is released to embrace the reinforcement, it will axially contract the spaced turns of the latter. The material of the tube causing this contraction being elastic, may of course be stretched upon the application of an axial tension whereupon the tube will lose its corrugation and allow the individual turns of the reinforcement to be extended whereupon the hose will elongate.

While the present invention has been described above in connection with certain specific embodiments thereof, it is to be understood that the specification and particularization has been for purposes of illustration only and in no way limits the scope or application of the invention as it is more particularly defined in the sub-joined claims.

We claim:

1. A method for the manufacture of reinforced flexible conduits comprising forming a tube of elastomeric thermoplastic material having a substantially uniform inside diameter and wall thickness, forming a resilient reinforcing coil of axially spaced helices having an outside diameter greater than the inside diameter of the tube, expanding said tube within its elastic limit to an inside diameter greater than the outside diameter of said coil, inserting the coil within the expanded tube, releasing the tube from its expanded position upon said coil, and locally heating said coil until said tube becomes bonded to the surface thereof and the axial relationship of said tube and said coil becomes fixed.

2. A method for the manufacture of reinforced flexible conduits comprising forming a tube of elastomeric thermoplastic material having a substantially uniform inside diameter and wall thickness, forming a resilient reinforcing coil having a thermoplastic surface and axially spaced helices of an outside diameter greater than the inside diameter of said tube, expanding said tube within its elastic limit to an inside diameter greater than the outside diameter of said coil, inserting the coil within the expanded tube, releasing the tube from its expanded position upon said coil, and locally heating said coil until said tube becomes bonded to the thermoplastic surface thereof.

3. A method for the manufacture of reinforced flexible conduits comprising forming a tube of elastomeric thermoplastic material having a substantially uniform inside diameter and wall thickness, forming a plastic coated resilient conductive strand into a reinforcing coil having axially spaced helices of an outside diameter greater than the inside diameter of said tube, expanding said tube within its elastic limit to an inside diameter greater than the outside diameter of said coil, inserting the coil within the expanded tube, releasing the tube from its expanded position upon said coil and locally heating said coil by passing an electric current therethrough until said tube becomes bonded to the thermoplastic surface thereof.

4. A method for the manufacture of reinforced flexible conduits comprising forming a tube of elastomeric thermoplastic material having a substantially uniform inside diameter and wall thickness, forming a resilient reinforcing coil of axially spaced helices having an outside diameter greater than the inside diameter of the tube, expanding said tube within its elastic limit to an inside diameter greater than the outside diameter of said coil, inserting the coil within the expanded tube, applying a heat responsive adhesive between the opposed surfaces of said tube and said coil, releasing the tube from its expanded position upon said coil, and locally heating said coil until said adhesive becomes set and the axial relationship of said tube and said coil becomes fixed.

5. A method for the manufacture of reinforced flexible conduits comprising forming a plastic coated wire into a helical coil, forming a tube of elastomeric thermoplastic material having a substantially uniform wall thickness and inside diameter, the latter of which is smaller than the outside diameter of said coil, enlarging the diameter of said tube relative to the diameter of said coil while maintaining the material of said tube and said coil within its elastic limits until the latter may be inserted in the former, inserting the coil within the tube, applying a heat responsive adhesive between the opposed surfaces of said tube and said coil, reducing the diameter of the tube to approximately its original dimension to cause the tube to elastically embrace and partially surround the individual helices of said coil and assume a corrugated configuration, and passing an electric current through said wire until said coil becomes heated and said adhesive becomes set to fix the axial relationship of said tube and said coil.

6. A method for the manufacture of reinforced flexible conduits comprising forming a tube of elastomeric thermoplastic material having a substantially uniform inside diameter and wall thickness, applying a hardened coating of a heat responsive adhesive to a plastic coated wire, forming a helical coil having an outside diameter greater than the inside diameter of said tube from said plastic coated wire, enlarging the diameter of said tube relative to said coil without exceeding the elastic limit of the material of either until the latter may be inserted in the former, inserting the coil within the tube, reducing the diameter of the tube to approximately its original dimension to cause the tube to elastically embrace and partially surround the individual helices of said coil and assume a corrugated configuration, and passing an electric current through said wire until said coil becomes heated and said adhesive becomes set to fix the axial relationship of said tube and said coil.

References Cited in the file of this patent

UNITED STATES PATENTS

| | | |
|---|---|---|
| 2,272,704 | Harding | Feb. 10, 1942 |
| 2,467,559 | Mahlberg | Apr. 19, 1949 |
| 2,560,369 | Roberts | July 10, 1951 |
| 2,570,259 | McKinley | Oct. 9, 1951 |
| 2,715,914 | Roberts | Aug. 23, 1955 |
| 2,731,070 | Meissner | Jan. 17, 1956 |
| 2,739,616 | Duff | Mar. 27, 1956 |